United States Patent
Petel

(10) Patent No.: US 9,846,431 B2
(45) Date of Patent: Dec. 19, 2017

(54) METHOD FOR MAKING A REMOTELY OPERATED CONTROL OF A MOTOR VEHICLE SECURE USING A MOBILE TERMINAL

(71) Applicant: VALEO COMFORT AND DRIVING ASSISTANCE, Creteil (FR)

(72) Inventor: Laurent Petel, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 14/917,596

(22) PCT Filed: Sep. 9, 2014

(86) PCT No.: PCT/EP2014/069189
§ 371 (c)(1),
(2) Date: Mar. 9, 2016

(87) PCT Pub. No.: WO2015/032976
PCT Pub. Date: Mar. 12, 2015

(65) Prior Publication Data
US 2016/0224025 A1    Aug. 4, 2016

(30) Foreign Application Priority Data
Sep. 9, 2013 (FR) ..................... 13 02105

(51) Int. Cl.
*G05D 1/00* (2006.01)
*B62D 15/02* (2006.01)
(Continued)

(52) U.S. Cl.
CPC ........... *G05D 1/0055* (2013.01); *B60Q 9/002* (2013.01); *B62D 15/0285* (2013.01);
(Continued)

(58) Field of Classification Search
CPC ....... B61L 3/127; B60R 25/00; G05D 1/0027; B64C 39/024; G08G 1/163; G08G 1/0141; G08G 1/161
(Continued)

(56) References Cited

U.S. PATENT DOCUMENTS 5,940,007 A * 8/1999 Brinkmeyer ............ B60R 25/00
307/10.7
9,020,728 B2 * 4/2015 Goudy ................... G08G 1/161
701/70
(Continued)

FOREIGN PATENT DOCUMENTS

DE  10 2011 079703 A1   1/2013
EP       2295281 A1    3/2011
(Continued)

OTHER PUBLICATIONS

International Search Report issued in PCT/EP2014/069189 dated Dec. 5, 2014 (3 pages).
(Continued)

*Primary Examiner* — McDieunel Marc
(74) *Attorney, Agent, or Firm* — Osha Liang LLP

(57) ABSTRACT

A method for making the remotely operated control of a movement of a motor vehicle secure using a mobile terminal. The method includes the follow steps: triggering the remotely operated control of a movement of the motor vehicle by a user using the mobile terminal, verifying that the user is within sight of the motor vehicle by means of the mobile terminal, if the verification is positive and shows that the user is in sight of the motor vehicle, said remotely operated control of a movement of the motor vehicle is performed, and if not said control is inhibited.

16 Claims, 2 Drawing Sheets

Figure 1:
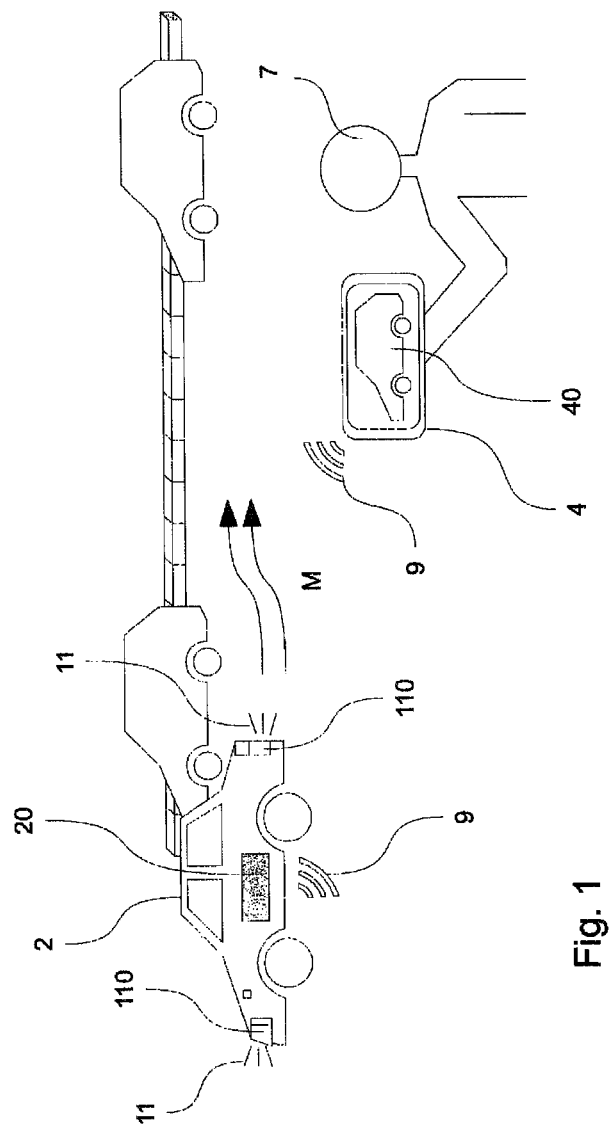

(51) Int. Cl.
*B60Q 9/00* (2006.01)
*B60W 30/06* (2006.01)
*B60W 50/00* (2006.01)

(52) U.S. Cl.
CPC ......... *G05D 1/0016* (2013.01); *G05D 1/0022* (2013.01); *G05D 1/0033* (2013.01); *B60W 30/06* (2013.01); *B60W 2050/0064* (2013.01); *G05D 2201/0213* (2013.01)

(58) Field of Classification Search
USPC .................. 701/2, 23, 70, 301; 307/10.7
See application file for complete search history.

(56) References Cited

U.S. PATENT DOCUMENTS

| | | | | |
|---|---|---|---|---|
| 9,031,776 | B2* | 5/2015 | Goudy | G08G 1/161 701/301 |
| 9,177,478 | B2* | 11/2015 | Konet | G08B 21/02 |
| 9,317,033 | B2* | 4/2016 | Ibanez-Guzman | G05D 1/0027 |
| 9,324,233 | B2* | 4/2016 | Grabow | G08G 1/0141 |
| 9,349,291 | B2* | 5/2016 | Goudy | G08G 1/163 |
| 2012/0022719 | A1* | 1/2012 | Matos | B64C 39/024 701/2 |
| 2013/0046421 | A1* | 2/2013 | El Fassi | B61L 3/127 701/2 |
| 2014/0358353 | A1* | 12/2014 | Ibanez-Guzman | G05D 1/0027 701/23 |

FOREIGN PATENT DOCUMENTS

EP 2 316 709 A2 5/2011
JP 2007/295033 A 11/2007

OTHER PUBLICATIONS

Written Opinion of the International Searching Authority issued in PCT/EP2014/069189 dated Dec. 5, 2014 (7 pages).

* cited by examiner

METHOD FOR MAKING A REMOTELY OPERATED CONTROL OF A MOTOR VEHICLE SECURE USING A MOBILE TERMINAL

The present invention is in the field of motor vehicles and more particularly relates to a method for providing safety for a remotely operated control of a maneuver of a motor vehicle by means of a mobile terminal.

In the motor vehicle field, the ability to remotely control certain functions of a motor vehicle by means of the mobile terminal such as for example a portable telephone or a smartphone securely connected with said motor vehicle is increasingly widespread. However, for safety reasons, it is necessary to make sure that the user is within sight of his/her vehicle before engaging certain particular control actions.

This is particularly the case for remotely-controlled actions that trigger a maneuver, automatic or driven by the user, of the motor vehicle. For example, this control action can be an automatic maneuver to park the vehicle while the user is outside the latter and to interrupt it in an emergency, for example when a cyclist or children approach, who were not present when the control action was engaged.

Estimating the distance between the motor vehicle and the mobile terminal as a function of the intensity of the communication signal connecting them, for example radio-frequency or Bluetooth©, is known. However, this method is not satisfactory since it does not provide for making sure that the user is definitely within sight of the motor vehicle.

One of the aims of the invention is therefore to provide a method for providing safety for a remotely operated control of a maneuver of a motor vehicle by a secure mobile terminal, where it is certain that the user is within sight of the motor vehicle.

The present invention therefore relates to a method for providing safety for a remotely operated control of a maneuver of a motor vehicle by a mobile terminal, including the following steps:

a user engaging, via the mobile terminal, a remotely operated control of a maneuver of the motor vehicle, verifying that the user is within sight of the motor vehicle by means of the mobile terminal, if the verification is positive and shows that the user is within sight of the motor vehicle, said remotely operated control of a maneuver of the motor vehicle is executed, otherwise said control action is stopped.

The method for providing safety for a remotely operated control of a maneuver of a motor vehicle by a mobile terminal according to the invention provides for making sure that the user is within sight of the motor vehicle before said maneuver is triggered. Thus this provides for improving the safety of the running of the maneuver since the user can at any moment visually check that the maneuver is taking place correctly.

According to one aspect of the invention, verifying that the user is within sight of the motor vehicle by means of the mobile terminal comprises the following steps:

randomly generating a sequence of visual signals, said sequence of visual signals being produced by the motor vehicle by virtue of visual signal means controlled by a control unit, and recording a result representing the sequence of visual signals produced, the user entering on the mobile terminal a representation which the user perceives of the sequence of visual signals produced by the motor vehicle, comparing the result representing the sequence of visual signals produced and the result representing the sequence of visual signals entered, if the results representing the sequence of visual signals produced and entered are identical, said remotely operated control of a maneuver of the motor vehicle is executed, otherwise said control is stopped.

According to one aspect of the invention, verifying that the user is within sight of the motor vehicle by means of the mobile terminal comprises the following steps:

randomly generating a sequence of visual signals, said sequence of visual signals being produced by the motor vehicle, in the form of one or more successive visual signals, by virtue of visual signal means controlled by a control unit, and recording a result representing said one or more successive signals of the sequence of visual signals produced, the user entering on the mobile terminal a representation which the user perceives of said one or more successive signals of the sequence of visual signals produced by the motor vehicle, comparing the result representing said one or more successive signals of the sequence of visual signals produced and the result representing said one or more successive signals of the sequence of visual signals entered, if the results representing the set of said one or more successive signals of the sequence of visual signals produced and entered are identical, said remotely operated control of a maneuver of the motor vehicle is executed, otherwise said control is stopped.

According to another aspect of the invention, prior to generating a sequence of visual signals, the relative position of the user with respect to the motor vehicle is determined, and the generation of the sequence of visual signals takes account of said relative position of the user with respect to the motor vehicle.

According to another aspect of the invention, the relative position of the user with respect to the motor vehicle is determined according to the type of maneuver of the motor vehicle engaged by the user.

According to another aspect of the invention, the relative position of the user with respect to the motor vehicle is determined by the user entering his/her relative position with respect to the motor vehicle via the mobile terminal and sending said relative position to the control unit.

According to another aspect of the invention, the generation of a sequence of visual signals is generated by the mobile terminal and transmitted to the control unit which reproduces it.

According to another aspect of the invention, the generation of a sequence of visual signals is carried out by the control unit of said motor vehicle.

According to another aspect of the invention, the comparison of the result representing the sequence of visual signals produced and the result representing the sequence of visual signals entered is performed by the mobile terminal.

According to another aspect of the invention, the comparison of the result representing the sequence of visual signals produced and the result representing the sequence of visual signals entered is performed by the control unit of said motor vehicle.

According to another aspect of the invention, the sequence of visual signals produced by the motor vehicle is a combination of luminous flashes generated by the signaling lights of the motor vehicle.

According to another aspect of the invention, verifying that the user is within sight of the motor vehicle by means of the mobile terminal is achieved by means of an optical sensor of the mobile terminal and a photographic shot of a distinctive element of the motor vehicle.

According to another aspect of the invention, verifying that the user is within sight of the motor vehicle by means of the mobile terminal is achieved by means of a laser signal emitted by the mobile terminal.

According to another aspect of the invention, the laser signal is an infrared type beam.

According to another aspect of the invention, the laser signal is emitted after the transmission of the remotely operated control of the maneuver to the motor vehicle.

According to another aspect of the invention, the laser signal is emitted after the transmission of the remotely operated control of the maneuver to the motor vehicle and said motor vehicle sends a signal confirming the reception of the laser signal to the mobile terminal.

Figure 2:
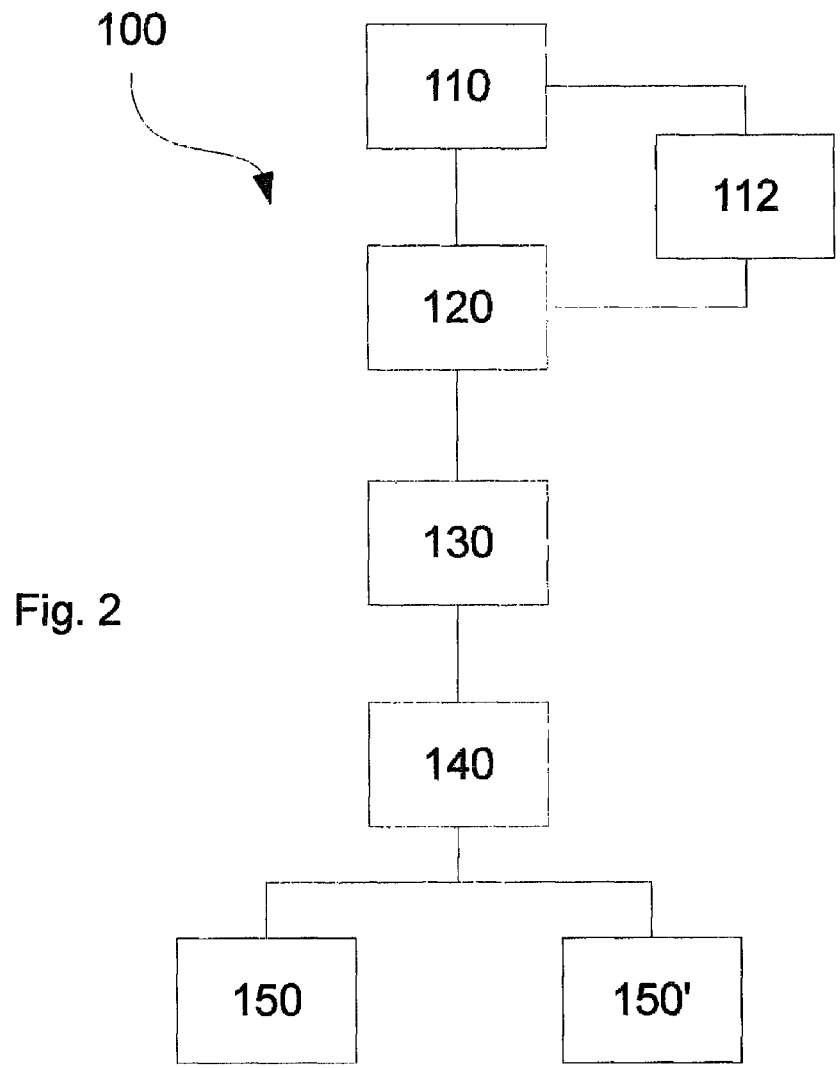

Other features and advantages of the invention will become clearer upon reading the following description, given by way of illustrative and non-limiting example, in which:

FIG. 1 shows a schematic representation of an application scenario of the method according to the invention, and FIG. 2 is a flow chart of the steps of the method for providing safety according to one particular embodiment.

With reference to FIGS. 1 and 2, the present invention therefore relates to a method 100 for providing safety for a remotely operated control of a maneuver of a motor vehicle 2 by means of a mobile terminal. Such a remote maneuvering control can notably be a control action for a maneuver, automatic or driven, represented by the reference M, to park the motor vehicle 2 with the aid of an automatic system performing this maneuver M while the user 7 is not at the steering wheel as illustrated in FIG. 1.

"Mobile terminal" 4 is understood to mean any mobile device, carried by a user 7 and able to communicate with the motor vehicle 2 for example by means of a Bluetooth© or radio-frequency connection. Such a mobile terminal 4 can notably be a smartphone.

In the method described below, it is assumed that the mobile terminal 4 and the motor vehicle 2 are in communication with one another by means of a wireless link 9 of the radio-frequency or Bluetooth© type and can exchange information and signals. This wireless link 9 is preferably secure, for example the mobile terminal 4 being identified with the motor vehicle 2 and vice versa.

A first step 110 of the method 100 for providing safety for a remotely operated control of a maneuver of a motor vehicle 2 is a step for engaging the remotely operated control of the maneuver M desired by the user 7 by means of the mobile terminal 4.

In response to this first step 110, a verification that the user 7 is within sight of the motor vehicle 2 by means of the mobile terminal 4 is carried out.

If the verification is positive and shows that the user 7 is within sight of the motor vehicle 2, said remotely operated control of a maneuver M of the motor vehicle 2 is executed, otherwise said control action is stopped. This verification thus provides for improving the safety of the running of the maneuver M since the user 7 can at any moment visually check that the maneuver is taking place correctly.

According to a first embodiment, illustrated in FIG. 2, the verification that the user 7 is within sight of the motor vehicle 2 by means of the mobile terminal 4 is performed by the user 7 reproducing on the mobile terminal 4 a sequence of visual signals 11 emitted by the motor vehicle 2. The visual signal means 110 of the motor vehicle can for example be the signaling lights, flashing. The sequence of visual signals 11 produced can thus notably be a combination of luminous flashes generated by the signaling lights of said motor vehicle 2.

In response to the control action engaged by the mobile terminal 4, a sequence of visual signals 11 is generated randomly and produced by the motor vehicle 2 by virtue of the visual signal means 110, during a second step 120.

The sequence of visual signals 11 can be generated directly by the mobile terminal 4 and then transmitted to the motor vehicle 2 in order that it reproduces the sequence.

On the other hand, the control action engagement can be sent directly from the mobile terminal 4 to a control unit 20 of the motor vehicle 2. The sequence of visual signals 11 can be generated by the control unit 20 which is capable of controlling the visual signal means 110.

A result representing the sequence of visual signals 11 produced is also recorded. This recording can be achieved by the mobile terminal 4 or by the control unit 20.

The sequence of visual signals 11 produced can be a combination of visual signals, the location of which on the motor vehicle 2 can vary depending on the location of the visual signal means 110. For example, in the case of luminous flashes, the sequence of visual signals 11 can be a combination in which the front, rear, right and left signaling lights switch on and off alternately.

The sequence of visual signals 11 produced can also exploit the duration of the visual signals emitted and vary between short and long visual signals, for example.

In order to generate a relevant sequence of visual signals 11, it can be necessary to know the position of the user 7 relative to the motor vehicle 2. Specifically, depending on where the user 7 is positioned relative to the motor vehicle 2, the latter is capable of not having in view all the visual signal means 110. The method can thus include, prior to the second step 120, an intermediate step 112 to determine the relative position of the user 7 with respect to the motor vehicle 2.

The relative position of the user 7 can be determined according to the type of maneuver M engaged by the user. Specifically, for example, when a parallel-parking maneuver is engaged in order to park the motor vehicle 2 automatically, the user must be positioned to one of the sides of said motor vehicle 2, as illustrated in FIG. 1. The user is therefore within sight of the front and rear signaling lights on only one of the sides of the motor vehicle 2. The sequence of visual signals 11 produced can thus be a combination of luminous flashes by alternating between the front and rear signaling lights of the motor vehicle 2. Alternatively, the movement of a component of the vehicle, such as the rearview mirror, window or wheel, can be used.

Likewise, for example, when a maneuver M is engaged to angle-park or perpendicular-park the motor vehicle 2, the user 7 must be positioned facing the front or the rear of the latter. The sequence of visual signals 11 produced can thus be a combination of luminous flashes by alternating between the left and right signaling lights of the motor vehicle 2.

The relative position of the user 7 can also be determined by direct entry of said relative position on the mobile terminal 4. The user 7 can thus, via the mobile terminal 4, indicate his/her position, for example indicating by pressing on a touchscreen his/her relative position with respect to a representation of the motor vehicle 2 or indicating which visual signal means 110 he/she has sight of.

In response to the second step 120 of random generation of a sequence of visual signals 11, of production of this sequence and of its recording, the user 7 enters, during a third step 130, on the mobile terminal 4 a representation of the sequence of visual signals 11 produced by the motor vehicle. This entry operation is performed, for example, by pressing on a touchscreen and reproducing said sequence on a representation 40 of the motor vehicle 2. Another entry means could involve checking checkboxes corresponding to the identification of each element that has produced a visual signal. In another embodiment, the entry could be replaced by a voice command indicating the sequence of visual signals produced.

In an alternative embodiment, the entry can be performed together with the visual signals produced, i.e. an entry following one or more signals which compose the sequence. This provides for stopping the control action as soon as an error occurs.

During a fourth step 140, the results representing the sequence of visual signals 11 produced by the motor vehicle 2 and the sequence of visual signals entered by the user 7 are compared.

This comparison can be performed either by the mobile terminal 4 or by the control unit 20.

If the results representing the sequence of visual signals 11 produced and entered are identical, the remotely operated control of a maneuver M of the motor vehicle 2 is executed, during a fifth step 150.

If the results representing the sequence of visual signals 11 produced and entered differ, the remotely operated control of a maneuver M of the motor vehicle 2 is stopped, during a fifth step 150'.

The stopping of the remotely operated control of a maneuver M of the motor vehicle 2 is preferably performed by the control unit 20 which can simply not execute the control action.

There will now be shown an actual example of an application of the method 100 for providing safety for a remotely operated control of a maneuver M of a motor vehicle 2 by a mobile terminal 4 according to the invention and as illustrated in FIG. 1.

First, the user 7, at the steering wheel of his/her motor vehicle 2, arrives at a parking place, in this case for parallel parking, and positions his/her motor vehicle 2 in order to park it.

The user 7 exits his/her motor vehicle 2 and engages an automatic parking maneuver M via his/her mobile terminal 4. First, the user 7 indicates on the mobile terminal 4 the visual signal means 110 which he/she can see.

From this information, a sequence of visual signals 110 is generated and produced by the motor vehicle 2. This sequence of visual signals 110 including for example two luminous flashes of the front lights followed by a luminous flash of the rear lights and again a luminous flash of the front lights.

The user 7 reproduces this sequence of visual signals 11, reproducing it by pressing on a reproduction 40 of the motor vehicle 2 displayed on the screen of the mobile terminal 4.

The sequence of visual signals 11 produced by the motor vehicle 2 and that entered by the user 7 on his/her mobile terminal 4 are compared. If the two sequences differ, the motor vehicle 2 does not move and an error message can be displayed on the mobile terminal 4. A new sequence of visual signals 11 can be produced by the motor vehicle 2 and the user 7 requested to make a new entry. If the two sequences match, the motor vehicle 2 performs the requested parking maneuver M.

According to a second embodiment, verifying that the user 7 is within sight of the motor vehicle 2 by means of the mobile terminal 4 is achieved by means of an optical sensor of the mobile terminal 4 and a photographic shot of a distinctive element of the motor vehicle 4.

In order to confirm that he/she is definitely within sight of the motor vehicle 2, the user 7 can use a function for capturing an image by means of an optical sensor present on the mobile terminal 4, for example the "photo" function, in order to capture a distinctive element of the motor vehicle 2, for example the license plate, recorded and identified beforehand. The mobile terminal 4, by means of recognition software can thus recognize the imaged captured and confirm whether the user 7 is within sight of the motor vehicle 2.

According to a third embodiment, verifying that the user 7 is within sight of the motor vehicle 2 by means of the mobile terminal 4 is achieved by means of a laser signal emitted by the mobile terminal 4. The laser signal, for example an infrared or visible type laser beam, is emitted by the mobile terminal 4 and, if the user is within sight of the motor vehicle 2, said motor vehicle 2 senses the laser signal by means of a suitable receiver.

The laser signal can be emitted after the transmission of the remotely operated control of the maneuver M to the motor vehicle 2. Thus, the latter can verify that the user 7 is within sight of the motor vehicle 2 and perform the maneuver M which it was controlled to do.

According to one variant, the laser signal can be emitted before the remotely operated control of the maneuver M is sent to the motor vehicle 2. The latter then sends a signal confirming the reception of the laser signal to the mobile terminal 4 which can then verify that the user 7 is within sight of the motor vehicle 2 by sending the remotely operated control of the maneuver M to the motor vehicle 2 which can perform the maneuver M.

Thus, it is clearly seen that the method for providing safety for a remotely operated control of a maneuver of a motor vehicle by a mobile terminal according to the invention provides for making sure that the user is within sight of the motor vehicle before said maneuver is triggered. Thus this provides for improving the safety of the running of the maneuver since the user can at any moment visually check that the maneuver is taking place correctly and interrupt it in an emergency, for example when a cyclist or children approach, who were not present when the control action was engaged.

The invention claimed is:

1. A method for providing safety for a remotely operated control of a maneuver of a motor vehicle by a mobile terminal, comprising:
   a user engaging, via the mobile terminal, a remotely operated control of a maneuver of the motor vehicle; and
   verifying that the user is within sight of the motor vehicle by the mobile terminal, wherein
   when the verification is positive and shows that the user is within sight of the motor vehicle, said remotely operated control of a maneuver of the motor vehicle is executed, otherwise said control is stopped.

2. The method for providing safety as claimed in claim 1, wherein verifying that the user is within sight of the motor vehicle comprises:
   randomly generating a sequence of visual signals, said sequence of visual signals being produced by the motor vehicle by virtue of a control unit, and recording a result representing the sequence of visual signals produced;

entering on the mobile terminal a representation which the user perceives of the sequence of visual signals produced by the motor vehicle; and comparing the result representing the sequence of visual signals produced and the result representing the sequence of visual signals entered, wherein when the results representing the sequence of visual signals produced and entered are identical, said remotely operated control of a maneuver of the motor vehicle is executed, otherwise said control is stopped.

3. The method for providing safety as claimed in claim 1, wherein verifying that the user is within sight of the motor vehicle comprises:

randomly generating a sequence of visual signals, said sequence of visual signals being produced by the motor vehicle, in the form of one or more successive visual signals, by virtue of a control unit, and recording a result representing said one or more successive signals of the sequence of visual signals produced;

entering on the mobile terminal a representation which the user perceives of said one or more successive signals of the sequence of visual signals produced by the motor vehicle and comparing the result representing said one or more successive signals of the sequence of visual signals produced and the result representing said one or more successive signals of the sequence of visual signals entered, wherein when the results representing the set of said one or more successive signals of the sequence of visual signals produced and entered are identical, said remotely operated control of a maneuver of the motor vehicle is executed, otherwise said control is stopped.

4. The method for providing safety as claimed in claim 2, further comprising, prior to generating a sequence of visual signals, determining the relative position of the user with respect to the motor vehicle, wherein the generation of the sequence of visual signals takes account of said relative position of the user with respect to the motor vehicle.

5. The method for providing safety as claimed in claim 4, wherein the relative position of the user with respect to the motor vehicle is determined according to the type of maneuver of the motor vehicle engaged by the user.

6. The method for providing safety as claimed in claim 4, the relative position of the user with respect to the motor vehicle is determined by the user entering his/her relative position with respect to the motor vehicle via the mobile terminal and sending said relative position to the control unit.

7. The method for providing safety as claimed in claim 2, wherein the generation of the sequence of visual signals is carried out by the mobile terminal and transmitted to the control unit which reproduces the sequence of visual signals.

8. The method for providing safety as claimed in claim 2, wherein the generation of a sequence of visual signals is carried out by the control unit of said motor vehicle.

9. The method for providing safety as claimed in claim 2, wherein the comparison of the result representing the sequence of visual signals produced and the result representing the sequence of visual signals entered is performed by the mobile terminal.

10. The method for providing safety as claimed in claim 2, wherein the comparison of the result representing the sequence of visual signals produced and the result representing the sequence of visual signals entered is performed by the control unit of said motor vehicle.

11. The method for providing safety as claimed in claim 2, wherein sequence of visual signals produced by the motor vehicle is a combination of luminous flashes generated by the signaling lights of said motor vehicle.

12. The method for providing safety as claimed in claim 1, wherein verifying that the user is within sight of the motor vehicle by the mobile terminal is achieved by an optical sensor of the mobile terminal and a photographic shot of a distinctive element of the motor vehicle.

13. The method for providing safety as claimed in claim 1, wherein verifying that the user is within sight of the motor vehicle by the mobile terminal is achieved by a laser signal emitted by the mobile terminal.

14. The method for providing safety as claimed in claim 13, wherein the laser signal is an infrared type beam.

15. The method for providing safety as claimed in claim 13, wherein the laser signal is emitted after the transmission of the remotely operated control of the maneuver to the motor vehicle.

16. The method for providing safety as claimed in claim 13, wherein the laser signal is emitted after the transmission of the remotely operated control of the maneuver to the motor vehicle, and said motor vehicle sends a signal confirming the reception of the laser signal to the mobile terminal.

* * * * *